United States Patent
Perkins

(10) Patent No.: US 9,580,130 B2
(45) Date of Patent: Feb. 28, 2017

(54) BICYCLE WITH DETACHABLE HEAD-TUBE SUBASSEMBLY

(71) Applicant: FORD GLOBAL TECHNOLOGIES, LLC, Dearborn, MI (US)

(72) Inventor: William Paul Perkins, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/631,952

(22) Filed: Feb. 26, 2015

(65) Prior Publication Data
US 2016/0251052 A1    Sep. 1, 2016

(51) Int. Cl.
| | |
|---|---|
| *B62K 15/00* | (2006.01) |
| *B62K 3/02* | (2006.01) |
| *B62J 6/18* | (2006.01) |
| *B62K 19/30* | (2006.01) |

(52) U.S. Cl.
CPC .............. *B62K 15/00* (2013.01); *B62J 6/18* (2013.01); *B62K 3/02* (2013.01); *B62K 19/30* (2013.01); *B62K 2015/001* (2013.01)

(58) Field of Classification Search
CPC .... B62K 15/00; B62K 15/006; B62K 15/008; B62K 2015/001; B62K 2015/005
See application file for complete search history.

(56) References Cited

U.S. PATENT DOCUMENTS

| | | | | |
|---|---|---|---|---|
| 3,675,944 A | * | 7/1972 | Kobayashi | 280/278 |
| 4,022,485 A | * | 5/1977 | Cox | 280/287 |
| 4,252,335 A | * | 2/1981 | Brenner | 280/287 |
| 4,585,246 A | * | 4/1986 | Diekman | B62K 19/30 |
| | | | | 280/281.1 |
| 4,768,798 A | * | 9/1988 | Reed | B62J 6/18 |
| | | | | 188/24.21 |
| 5,069,468 A | | 12/1991 | Tsai et al. | |
| 5,205,573 A | * | 4/1993 | Mhedhbi | 280/287 |
| 5,509,676 A | * | 4/1996 | Fukutake | B62K 25/08 |
| | | | | 280/276 |

(Continued)

FOREIGN PATENT DOCUMENTS

| | | |
|---|---|---|
| CH | 708860 A | 5/2015 |
| DE | 29513779 U1 | 11/1995 |

(Continued)

OTHER PUBLICATIONS

Morph Technologies Split Frame Design; http://kinderbikeusa.com/main/indexphp?option=com_content&view=article&id=98&itemid=198&lang=en; Nov. 13, 2014; pp. 1-2; KinderBike, North America; Aurora, Colorado.

(Continued)

*Primary Examiner* — Tony Winner
(74) *Attorney, Agent, or Firm* — Frank A. MacKenzie; Brooks Kushman P.C.

(57) ABSTRACT

A bicycle may include a detachable head subassembly comprising a fork configured to support a front wheel, and handlebars connected to the fork via a stem at least partially disposed in a head-tube. The head-tube has a first attachment feature. The bicycle may also include a frame having a second attachment feature. The first and second attachment features cooperate to releasably attach the head subassembly to the frame.

18 Claims, 2 Drawing Sheets

(56) References Cited

U.S. PATENT DOCUMENTS

| | | | |
|---|---|---|---|
| 5,791,671 A * | 8/1998 | Tang | B62K 21/18 |
| | | | 280/264 |
| 6,015,118 A * | 1/2000 | Oda | B62J 99/00 |
| | | | 248/65 |
| 6,364,334 B1 | 4/2002 | Kuba | |
| 7,000,936 B2 * | 2/2006 | Schmider | B62K 21/00 |
| | | | 280/281.1 |
| 7,578,515 B2 | 8/2009 | Appleman | |
| 7,942,434 B2 * | 5/2011 | Myers | 280/287 |
| 2006/0055131 A1 | 3/2006 | Elfandi | |
| 2007/0108723 A1 * | 5/2007 | Fukui | B62J 6/18 |
| | | | 280/276 |
| 2007/0120342 A1 | 5/2007 | Daniels | |
| 2007/0222173 A1 | 9/2007 | Huang | |
| 2007/0273125 A1 | 11/2007 | Appleman | |
| 2008/0088113 A1 * | 4/2008 | Menayan | 280/287 |
| 2009/0058038 A1 * | 3/2009 | Dodman et al. | 280/274 |
| 2010/0041523 A1 * | 2/2010 | Bingham, Jr. | A63B 21/225 |
| | | | 482/65 |
| 2010/0052285 A1 | 3/2010 | Wang et al. | |
| 2010/0212978 A1 * | 8/2010 | Huang | B62K 15/008 |
| | | | 180/65.31 |
| 2011/0057413 A1 * | 3/2011 | Lee | 280/278 |
| 2012/0098233 A1 * | 4/2012 | Groendal | 280/283 |
| 2012/0169029 A1 * | 7/2012 | Marais | B62K 15/006 |
| | | | 280/287 |
| 2013/0009379 A1 * | 1/2013 | Matthews | B62K 19/32 |
| | | | 280/279 |
| 2013/0306392 A1 * | 11/2013 | Schaap | 180/220 |
| 2014/0049022 A1 * | 2/2014 | Dopf | 280/278 |
| 2014/0225346 A1 * | 8/2014 | Bettin | 280/236 |

FOREIGN PATENT DOCUMENTS

| | | |
|---|---|---|
| DE | 19835242 A1 | 2/2000 |
| NL | 57337 C | 4/1946 |

OTHER PUBLICATIONS

Search Report from related Great Britain application No. GB1603017.3, dated Jul. 26, 2016.

* cited by examiner

BICYCLE WITH DETACHABLE HEAD-TUBE SUBASSEMBLY

TECHNICAL FIELD

This disclosure relates to pedal-driven vehicles, such as bicycles, and more specifically to a bicycle with a detachable head subassembly for removing a head-tube from a frame.

BACKGROUND

A bicycle, also referred to as a bike or cycle, is a vehicle which provides for a human-powered, generally pedal-driven, means to propel the vehicle. Bicycles are generally single-track vehicles, having two wheels attached to a frame, one behind the other. Bicycles generally have a power driven rear wheel and a free spinning turnable front wheel. The term bicycle generally refers to a vehicle having two (bi) circular arrangements (cycle), however, as used in this patent application the term bicycle may also be considered to extend to tricycle and quadcycle vehicles having two side-by-side power driven wheels and/or two side-by-side free spinning wheels. The term bicycle may also include vehicles that have additional wheels used to provide stability, such as stabilizer wheels, out-rigger wheels, or training wheels.

A bicycle may also include supplemental forms of propulsion, such as a motor (sometimes referred to as an electric bicycle) or engine. However a motor or engine driven vehicle similar to that of a bicycle, but without human-powered propulsion means, would be considered a motorcycle and not a bicycle. The term bicycle, as used in this patent application, does not include motorcycles or the like.

Bicycles were introduced in the 19th century in Europe and number more than a billion worldwide. Bicycles are the principal means of transportation in many regions. They also provide a popular form of recreation, and have been adapted for use in military and police applications, in courier services, as children's toys, and in racing.

Bicycle storage can pose many problems for owners. A full-size, fully function adult bicycle may have 26-inch wheels/tires (or larger), as well as a large rigid frame providing for comfortable dimensions between handlebars, seat, and pedals. As well, handlebars are set 90 degrees off from the diameter of the front wheel making it additionally difficult to easily stow in a car, office, or at home. Smaller folding bicycles have been designed making it easier to stow, but they have not provided the desired comfort or rigidity that a full size adult frame may provide for most riding scenarios.

SUMMARY

One aspect of this disclosure is directed to a bicycle having a head subassembly detachable from a frame. The detachable head subassembly has a fork configured to support a front wheel. The subassembly also has handlebars connected to the fork via a stem. The subassembly has a head-tube and the stem is at least partially disposed in the head-tube. The head-tube of this bicycle has a first attachment feature and the frame has a second attachment feature. The first and second attachment features cooperate to releasably attach the head subassembly to the frame.

Another aspect of this disclosure is directed to a split-frame pedal-driven vehicle. The pedal-driven vehicle has a head-tube defining a first attachment feature on an outer surface. The pedal-driven vehicle also has a down-tube with a leading end and a trailing end. The leading end of the down-tube has a second attachment feature. The trailing end of the down-tube provides a connection location for a pedal-driven crank. The first and second attachment features cooperate to releasably connect the head-tube to the down-tube.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Described herein is a bicycle having a frame and a detachable head assembly. The head assembly may be easily removed so that the bicycle may be easily stored and transported. An attachment mechanism at the head assembly may mate with an attachment mechanism at the frame to create a strong connection between the frame and head assembly so that when in an attached state, a rider's weight is bore by the frame and not by the attachment mechanisms.

Figure 1:
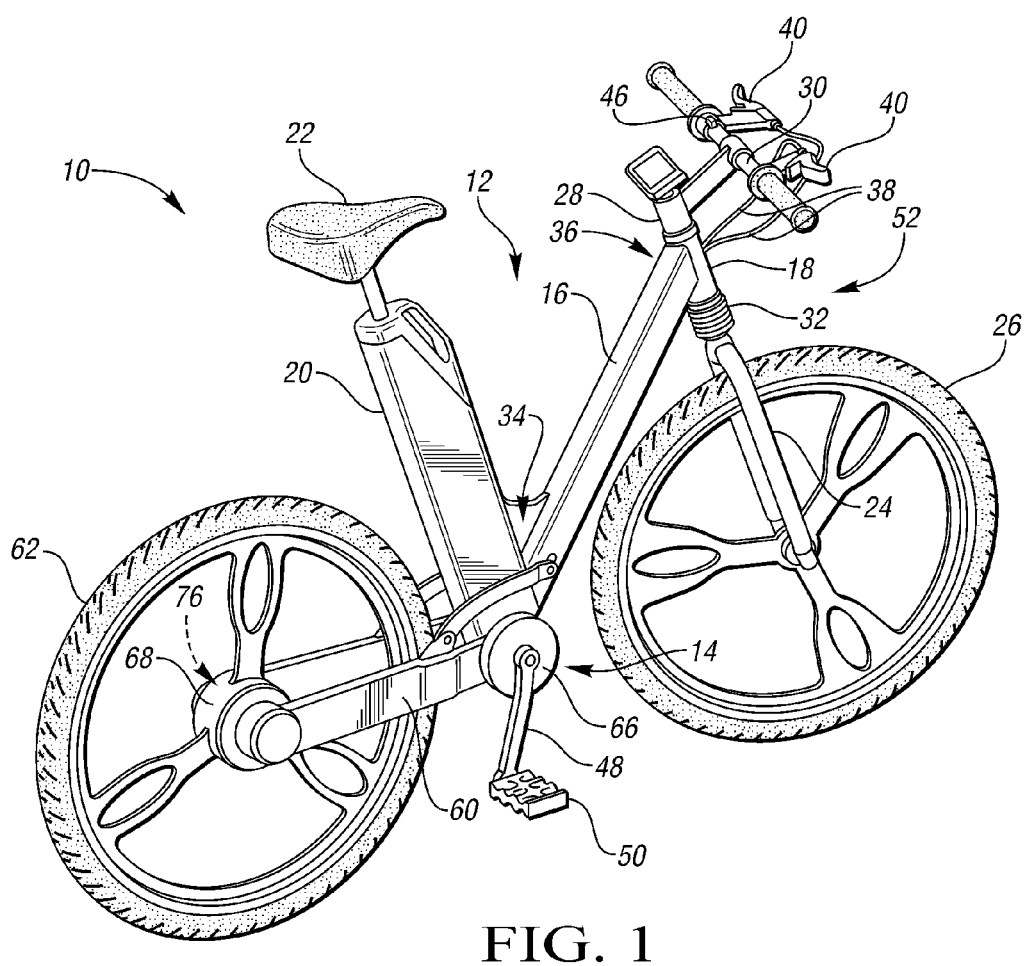
FIG. 1 is a perspective view of a bicycle.

FIG. 1 shows a bicycle 10 having a frame 12. The frame 12 defines a hanger bracket 14, a down-tube 16, and a head-tube 18. Frame 12 has the hanger bracket 14 connected to the down-tube 16. Frame 12 has the head-tube 18 connected to the down-tube 16. The down-tube 16 may have a trailing end 34 providing a connection location for a crank 66 and a leading end 36 having an attachment feature for connecting with the down-tube 16. Frame 12 may also have a seat stay 20 for supporting a seat 22. The seat stay 20 may be connected to the down-tube 16 proximate the hanger bracket 14, the seat stay 20 may be connected solely to the hanger bracket 14, or the seat stay may be connected to both the hanger bracket 14 and the down-tube 16.

A steerable front fork 24 may be used to support a front wheel 26. The term wheel, as used herein, may include a tire, a rim, and a support structure, such as spokes or the like, to support the tire and rim. A stem 28 may connect the front fork 24 to a set of handlebars 30. The stem 28 may be partially disposed within the head-tube 18 and may have bearings sandwiched between the stem 28 and inner surface of the head-tube 18 to allow the handlebars 30 to turn the front fork 24 and front wheel 26. A front shock-absorber 32, or front suspension system 32, may also be utilized to provide damped vibration between the handlebars 30 and the front wheel 26. The front shock-absorber 32 may be disposed in-line or between the front fork 24 and the stem 28.

A pedal 50 may be connected to a pedal arm 48 and may be configured to propel drive or propel the bicycle 10. A user may push the pedal 50 to rotate a gear and thus a chain connected therein (not shown) to drive the rear wheel 62 forwards. Additionally or alternatively, power sources, such as batteries, may also propel the vehicle in addition to, or without user interaction at the pedals.

A rear stay 60 may connect a rear wheel 62 to the frame 12. The rear stay 60 is pivotally connected about the hanger bracket 14. The rear stay 60 may be pivotally connected to the frame 12 about a crank 66 and also may be connected to a wheel hub 68 that supports the rear wheel 62. A gearbox 76 may be disposed in the rear hub 68. The gearbox 76 may be configured to provide a number of speeds for the bicycle 10. The gearbox 76 may be configured to provide at least two speeds for the bicycle 10.

Figure 2:
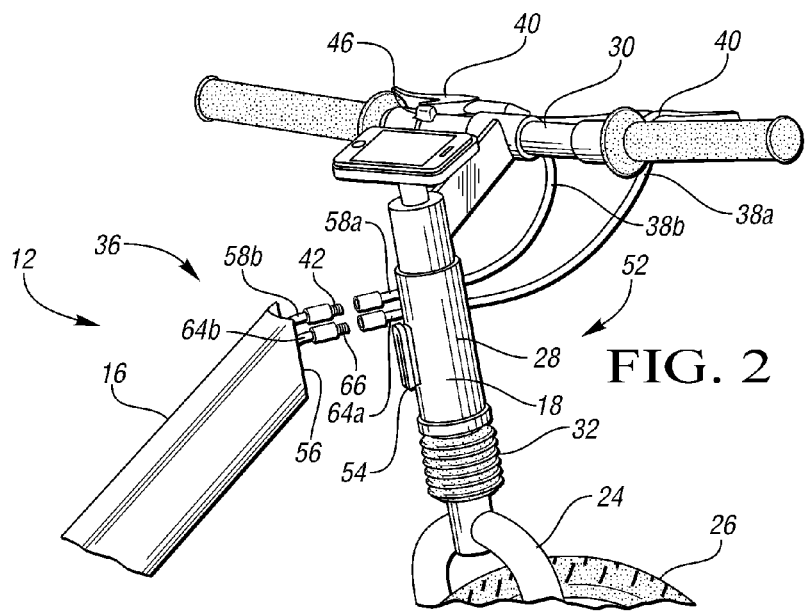
FIG. 2 is a partial view of a bicycle having a head subassembly disconnected from a down-tube of a frame.
Figure 3:
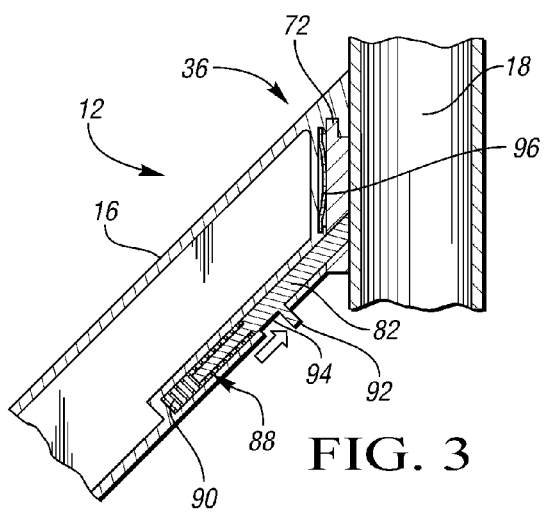
FIG. 3 is a cross-sectional view of a first attachment feature engaged with a second attachment feature.
Figure 4:
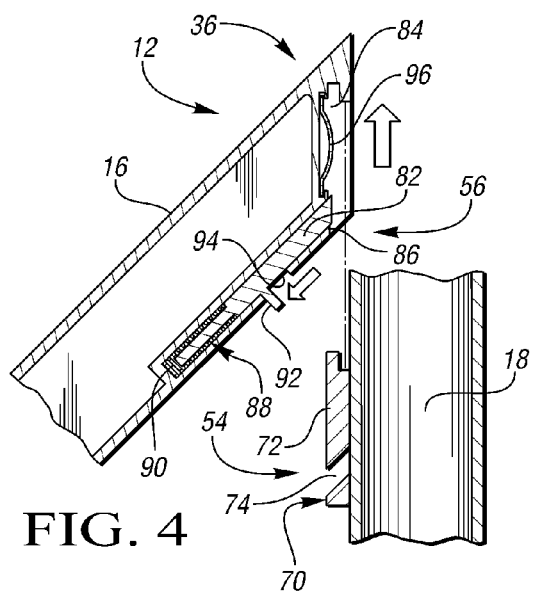
FIG. 4 is a cross-sectional view of a first attachment feature disengaged from a second attachment feature.

Referring to FIGS. 2-4, the bicycle 10 may comprise a detachable head assembly 52. FIGS. 2 and 4 show the head assembly 52 in a detached state from the frame 12. FIG. 3 shows the head assembly 52 in an attached state. The head assembly 52 may include the handlebars 30, the fork 24, the stem 28, and the head-tube 18. The stem 28 may be at least partially disposed with in the head-tube 18. The head-tube 18 may include a first attachment feature 54 (also referred to herein as the first attachment mechanism 54). The frame 12, or more specifically the down-tube 16, may include a second attachment feature 56 (also referred to as the second attachment mechanism 56) configured to cooperate with the first attachment feature 54 in order to releasably attach the head assembly 52 to the frame 12.

The first attachment feature 54 may include an outward projection 72 extending from an external surface of the head-tube 18 forming a cross-sectional profile along its length that is configured to fit within a slot 84 of the second attachment feature 56. The projection 72 may have a generally T-shaped cross-sectional profile. The projection 72 may also have other profiles, such as a triangular profile, quadratic profile, etc. The first attachment feature 54 may include a first locking mechanism 70. The first locking mechanism 70 may define a latch-hole 74 configured to receive a pin 82 from the second attachment feature 56 within the down-tube 16 in an effort to retain the head assembly 52 to the frame 12.

The second attachment feature 56 may include a slot 84 defined by the down-tube 16 of the frame 12. The down-tube 16 may define an opening 86 at an underside of the down-tube 16 configured to accept the projection 72 at the opening 86. The slot 84 may proceed to accept the projection 72 until the down-tube 16 is fully seated on the first attachment feature 54.

Second attachment feature 56 may include a second locking mechanism 88. The second locking mechanism 88 may include the slidable retention pin 82. As explained, a head of the retention pin 82 may be configured to be maintained within the latch-hole 74 of the first attachment mechanism 54. A retention spring 90 may be arranged at a distal end of the pin 82 and configured to bias the retention pin 82 towards the first attachment feature 54. The locking mechanism 88 may include a knob 92 accessible via a knob slot 94 at the underside of the down-tube 16. The knob 92 may engage the pin 82 such that the pin 82 is configured to move with the knob 92. For example, if the knob 92 is moved towards the second attachment feature 56, the pin 82 also moves forward. In this example, as shown in FIG. 3, the head of the pin 82 may be received by the latch-hole 74. In this attached state, the pin 82 may block the opening 86, thus retaining the projection 72 with in the slot 84.

In a detached state, as shown in FIGS. 2 and 4, the down-tube 16 may be disengaged from the head-tube 18 of the detachable head assembly 52. In this state, the head assembly 52 may be removed from the rest of the frame 12. In order for the head assembly 52 and the down-tube 16 to disengage one another, the knob 92 may be pulled towards the distal end of the down-tube 16 against the biasing force of the spring 90, thus releasing the head of the pin 82 from the latch-hole 74. By releasing the pin 82 from the latch-hole 74, the opening 86 may be exposed allowing the projection 72 to slide downward and out of the slot 84.

To reattach the head assembly 52 with the down-tube 16, the knob 92 may again be moved against the biasing of the retention spring 90, thus leaving the opening 86 unobstructed by the pin 82 so that the projection 72 of the first attachment feature 54 may slide through the opening 86 into the slot 84. The biasing of the pin 82 may then project the head of the pin 82 into the latch-hole 74.

The second attachment feature 56 may include a leaf spring 96 with in the slot 84. The leaf spring 96 may be configured to elastically deform between portions of the first attachment feature 54 and the second attachment feature 56 in the engaged state. The leaf spring 96 may create a biasing between the projection 72 and the slot 84 to increase the frictional fit there between.

Cable and wires, such as sectional brake cables 38 and section shifter cables (not shown generally) may extend from the handlebars 30 through portions of the frame 12. For example, the cables may extend through the down-tube 16 and to the brakes (not shown) and gearbox 76. During disengagement and engagement of the head assembly 52 and the frame 12, the cables may be disconnected and reconnected.

For example, the sectional brake cables 38 connected to brake handles 40 may be disconnected and connected. The sectional brake cable 38 may include a first portion 38a connected to a brake handle 40 and configured to control a brake (not shown) at the front wheel 26. The sectional brake cable 38 may include a second portion 38b connected to the other of the brake handles 40 and configured to control a brake (not shown) at the rear wheel 62. The second portion 38b may be secured through the interior of the down-tube 16 and extend to the rear brake. The second portion 38b may include a first segment 58a and a second segment 58b. The first and second segments 58a, 58b may disconnected so that the detachable head assembly 52 may be removed from the frame 12, as depicted in FIG. 2. The first segment 58a may be reconnected with the second segment 58b via a brake cable connection mechanism 42. The connection mechanism 42 may include a cable separator having a threaded, quick release-type barrel fastener.

Thus, the first and second segments 58a, 58b of the brake cable 38 are connected when the first and second attachment features 54, 56 are engaged so as to retain functionality of the back brake. Likewise, the first and second segments 58a, 58b are disconnected when the first and second attachment features 54, 56 are disengaged. In the example described herein, only one of the brake portions 38a, 38b may connected and disconnected. For example, the second portion configured to control the rear brake may be the only one of the brake cables 38 extending alongside or within the down-tube 16 while the first portion may be routed downward via fasteners along the front fork 24 to the front brake.

In addition to the brake cable 38, a section shifter cable (not shown generally) may be connected to a gear selection mechanism 46 and may have a first segment 64a and a second segment 64b. The second segment 64b may be secured alongside or within the down-tube 16 and extend to the gearbox 76. Similar to the brake cable 38, the first and second segments 64a, 64b may be connected and disconnected via a shifter cable connection mechanism 66 depending on the state of the detachable head assembly 52.

Accordingly, via the first and second attachment mechanisms, the detachable head assembly may be removed from the frame. By easily removing the head assembly, a bicycle may be easily stored, transported, protected from theft, etc. Moreover, the first and second attachment mechanisms, when mated in an attached state, may add increased stability to the frame. The stability may be increased, at least in part, due to the T-shaped slide-rail arranged on the head-tube and received by the slot on the down-tube. The second attachment mechanism on the down-tube may also include a leaf-spring on each side of the T-shaped slot to keep the head-tube tightly secured within the slot. A spring-loaded pin may also be included at the down-tube and received by a pin slot at the head-tube to ensure a tight connection until a rider dismounts the bicycle. The pin is protected from undue impact loads during riding at least in part because the rail of the frame bears the rider's weight since the down-tube slides onto the head-tube from above. The rider may then retract the pin and slide the head-tube downwards out of the slot of the down-tube to detach the head assembly from the frame.

With regard to the processes, systems, methods, heuristics, etc., described herein, it should be understood that, although the steps of such processes, etc., have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A bicycle comprising:
   a head-tube defining a first attachment feature;
   a down-tube having a second attachment feature configured to releasably engage with the first attachment feature; and
   a cable having a first portion maintained within the head-tube and a second portion maintained within the down-tube, wherein the second portion is connectable to the first portion when the first and second attachment features are engaged with each other, and the second portion is disconnectable from the first portion when the first and second attachment features are disengaged from each other.

2. The bicycle of claim 1 wherein the first attachment feature projects outwardly from an external surface of the head-tube.

3. The bicycle of claim 2 wherein the second attachment feature includes a slot defined by the down-tube for receiving the first attachment feature.

4. The bicycle of claim 2 wherein the first attachment feature has a cross-sectional profile along a length thereof to provide positive retention of the second attachment feature with the first attachment feature.

5. The bicycle of claim 1 wherein the second attachment feature defines an opening at a bottom thereof, the opening is sized to accept the first attachment feature.

6. The bicycle of claim 1 wherein the first attachment feature is slidable generally downwardly from the second attachment feature to detach the head-tube from the down-tube.

7. The bicycle of claim 1 wherein the first attachment feature has a locking feature.

8. The bicycle of claim 7 wherein the locking feature defines a latch-hole, and further comprises a slidable retention pin attached to the down-tube and configured to be disposed within the latch-hole to retain the head-tube to the down-tube.

9. The bicycle of claim 8 further comprising a retention spring biasing the retention pin toward the first attachment feature.

10. The bicycle of claim 1 further comprising a leaf spring retained by the second attachment feature and configured to elastically deform between portions of the first and second attachment features when engaged with each other.

11. A pedal-driven vehicle comprising:
    a head-tube defining a first attachment feature;
    a down-tube having a trailing end, and a leading end having a second attachment feature configured to releasably engage with the first attachment feature; and
    at least one cable having a first portion maintained within the head-tube and a second portion maintained within the down-tube, wherein the second portion is connectable to the first portion when the first and second attachment features are engaged with each other, and the second portion is disconnectable from the first portion when the first and second attachment features are disengaged from each other.

12. The pedal-driven vehicle of claim 11 further comprising a retention pin connected to the down-tube and the head-tube further defining a pin hole, wherein the retention pin is slidably disposable within the pin hole when the first attachment feature is seated within and engaged with the second attachment feature.

13. The pedal-driven vehicle of claim 12 further comprising a retention pin spring configured to bias the retention pin toward the pin hole when the first and second attachment features are engaged with each other.

14. The pedal-driven vehicle of claim 11 further comprising:
    a front fork configured to support a front wheel, a handlebar, and a stem connectably disposed between the front fork and handlebar and partially disposed within the head-tube.

15. The pedal-driven vehicle of claim 14 wherein the at least one cable includes a sectional brake cable having a first brake cable portion connected to a brake handle at the handlebar and a second brake cable portion secured by the down-tube and extending to a rear brake, wherein the first and second brake cable portions are connectable to each other when the first and second attachment features are engaged with each other, and the first and second brake cable portions are disconnectable from each other when the first and second attachment features are disengaged from each other.

16. The pedal-driven vehicle of claim 14 wherein the at least one cable includes a sectional shifter cable having a first segment connected to a gear selection mechanism at the handlebar and a second segment routedly secured by the down-tube and extending to a gearbox, wherein the first and second segments are connectable to each other when the first and second attachment features are engaged with each other, and the first and second segments are disconnectable from each other when the first and second attachment features are disengaged from each other.

17. The pedal-driven vehicle of claim 14 wherein the first attachment feature is a T-shaped projection extending from an outer surface of the head-tube along a length of the head-tube, and the second attachment feature is a slot configured to accept the T-shaped projection.

18. The pedal-driven vehicle of claim 17 wherein the slot has a bottom opening and the T-shaped projection is configured to be disposable in the slot by being moved generally upward into the slot and is configured to be detachable from the slot by being moved generally downward out of the slot.

\* \* \* \* \*